(12) United States Patent
Li et al.

(10) Patent No.: US 9,923,673 B2
(45) Date of Patent: Mar. 20, 2018

(54) METHOD FOR PROCESSING FEEDBACK INFORMATION, BASE STATION, AND USER EQUIPMENT

(71) Applicant: Huawei Technologies Co., Ltd., Shenzhen, Guangdong (CN)

(72) Inventors: Chaojun Li, Beijing (CN); Sha Ma, Beijing (CN); Qiang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 14/801,408

(22) Filed: Jul. 16, 2015

(65) Prior Publication Data

US 2015/0326354 A1  Nov. 12, 2015

Related U.S. Application Data

(63) Continuation of application No. PCT/CN2013/070683, filed on Jan. 18, 2013.

(51) Int. Cl.
*H04L 1/18* (2006.01)
*H04L 5/00* (2006.01)
(Continued)

(52) U.S. Cl.
CPC .......... *H04L 1/1861* (2013.01); *H04L 1/1854* (2013.01); *H04L 1/1864* (2013.01);
(Continued)

(58) Field of Classification Search
CPC .............................. H04W 52/20; H04W 52/262
(Continued)

(56) References Cited

U.S. PATENT DOCUMENTS

2008/0133995 A1*  6/2008  Lohr ................... H04L 1/1678
714/748
2008/0273490 A1* 11/2008  Sayana ................. H04L 1/0003
370/329
(Continued)

FOREIGN PATENT DOCUMENTS

CN   101202609 A   6/2008
CN   101252379 A   8/2008
(Continued)

OTHER PUBLICATIONS

"Conveying multiple ACKs on UL in support of CA", Qualcomm Incorporated, 3GPP TSG RAN WG1 #60bis, Apr. 12-16, 2010, 5 pages, R1-102320.
(Continued)

*Primary Examiner* — Farah Faroul

(57) ABSTRACT

Embodiments of the present invention provide a method for processing feedback information, a base station, and a user equipment. The method includes: determining, by a base station, a feedback manner of HARQ feedback information, where the feedback manner includes feeding back the HARQ feedback information or not feeding back the HARQ feedback information; and sending, by the base station, first signaling to a user equipment, where the first signaling carries the feedback manner of the HARQ feedback information. The embodiments of the present invention can improve an HARQ mechanism, so as to support new technologies in a small cell more effectively.

19 Claims, 3 Drawing Sheets

(51) Int. Cl.
*H04W 72/04* (2009.01)
*H04W 52/26* (2009.01)
*H04W 72/12* (2009.01)
*H04W 52/20* (2009.01)
*H04L 1/16* (2006.01)
*H04L 1/20* (2006.01)
*H04W 52/14* (2009.01)
*H04W 52/24* (2009.01)

(52) U.S. Cl.
CPC ......... *H04L 5/0053* (2013.01); *H04W 52/262* (2013.01); *H04W 72/0413* (2013.01); *H04W 72/1231* (2013.01); *H04L 1/1685* (2013.01); *H04L 1/1825* (2013.01); *H04L 1/203* (2013.01); *H04W 52/146* (2013.01); *H04W 52/20* (2013.01); *H04W 52/248* (2013.01)

(58) Field of Classification Search
USPC ........................................................ 370/252
See application file for complete search history.

(56) References Cited

U.S. PATENT DOCUMENTS

| | | | | |
|---|---|---|---|---|
| 2009/0016291 A1* | 1/2009 | Oota | ..................... | H04L 5/0091 370/329 |
| 2009/0235139 A1* | 9/2009 | Park | ..................... | H04L 1/1819 714/750 |
| 2009/0325503 A1* | 12/2009 | Tamazawa | ........ | H04W 36/0088 455/67.11 |
| 2010/0014448 A1 | 1/2010 | Wentink et al. | | |
| 2010/0056067 A1* | 3/2010 | Kim | ........................ | H04L 27/12 455/69 |
| 2010/0110879 A1* | 5/2010 | Kim | ..................... | H04L 1/1685 370/216 |
| 2010/0311430 A1* | 12/2010 | Katayama | ............. | H04L 1/0027 455/450 |
| 2011/0183697 A1* | 7/2011 | Akimoto | ............... | H04L 5/0007 455/509 |
| 2011/0274077 A1* | 11/2011 | Yamada | .............. | H04W 72/042 370/329 |
| 2011/0276852 A1* | 11/2011 | Mueller-Weinfurtner | .......... | H04L 1/1812 714/749 |
| 2012/0127934 A1* | 5/2012 | Anderson | ......... | H04W 72/0406 370/329 |
| 2012/0218881 A1* | 8/2012 | Liang | .................... | H04L 1/1861 370/216 |
| 2012/0281645 A1* | 11/2012 | Li | ......................... | H04L 1/1829 370/329 |
| 2013/0107735 A1* | 5/2013 | Hoymann | ............. | H04L 1/1822 370/252 |
| 2013/0107832 A1* | 5/2013 | Kim | ....................... | H04B 7/024 370/329 |
| 2013/0114474 A1* | 5/2013 | Fu | ......................... | H04L 5/0055 370/280 |
| 2013/0176952 A1* | 7/2013 | Shin | ....................... | H04L 5/001 370/329 |
| 2013/0301548 A1* | 11/2013 | Etemad | ............... | H04W 76/048 370/329 |
| 2014/0044205 A1* | 2/2014 | Kim | ..................... | H04B 7/0404 375/260 |
| 2014/0105102 A1* | 4/2014 | Balraj | ................... | H04L 1/0026 370/328 |
| 2014/0286276 A1* | 9/2014 | Lunttila | ................ | H04B 7/024 370/329 |
| 2014/0307631 A1* | 10/2014 | Miao | ..................... | H04L 1/0015 370/328 |
| 2014/0362798 A1* | 12/2014 | Shu | ....................... | H04L 1/1861 370/329 |
| 2015/0078231 A1* | 3/2015 | Bergstrom | ........ | H04W 72/1242 370/311 |
| 2015/0117300 A1* | 4/2015 | Nam | ..................... | H04L 1/1819 370/315 |

FOREIGN PATENT DOCUMENTS

| | | |
|---|---|---|
| CN | 101388756 A | 3/2009 |
| JP | 2011-211495 A | 10/2011 |
| WO | 2009/002740 A1 | 12/2008 |
| WO | WO 2008/156336 A1 | 12/2008 |

OTHER PUBLICATIONS

"Robust MAC signalling", Research in Motion Limited, 3GPP TSG RAN WG2 Meeting #57bis, Mar. 26-30, 2007, 3 pages, R2-071262.

\* cited by examiner

METHOD FOR PROCESSING FEEDBACK INFORMATION, BASE STATION, AND USER EQUIPMENT

CROSS-REFERENCE TO RELATED APPLICATIONS

This application is a continuation of International Application No. PCT/CN2013/070683, filed on Jan. 18, 2013, which is hereby incorporated by reference in its entirety.

TECHNICAL FIELD

The present invention relates to a communications technology, and in particular, to a method for processing feedback information, a base station, and a user equipment.

BACKGROUND

With the development of mobile communications, a series of miniaturized base stations are introduced, which include a femtocell, a picocell, a metrocell, a microcell, and the like, and these technologies may be collectively referred to as small cells.

In a small cell, to satisfy requirements of instantaneous uplink and downlink service volume, a flexible subframe may be introduced, and each flexible subframe may be dynamically configured to be an uplink subframe or a downlink subframe. In the small cell, a fake uplink subframe may be introduced, in other words, no uplink data is sent in the subframe. In the small cell, to match a service requirement and an interference change, a user equipment (UE) may rapidly switch between different carriers. In the small cell, a UE that has only a single uplink transmit chain capability may communicate with different base stations, and the different base stations exchange information by using non-ideal backhaul.

Currently, in a Long Term Evolution (LTE) system, uplink and downlink hybrid automatic repeat request (HARQ) feedback, in other words, an acknowledgement (ACK) or a non-acknowledgement (NACK) (hereinafter referred to as ACK/NACK for short), is sent according to a fixed time sequence relationship.

Because the new technologies are introduced into the small cell, if the HARQ feedback sent according to the fixed sequential relationship in the LTE is still used in the small cell, the use of the flexible subframe, the fake uplink subframe, and rapid carrier switching are limited, and the UE with the single uplink transmit chain capability cannot be well supported. Therefore, to support the new technologies in the small cell more effectively, a current HARQ mechanism needs to be improved.

SUMMARY

In view of this, embodiments of the present invention provide a method for processing feedback information, a base station, and a user equipment, which are used to improve an HARQ mechanism, so as to support new technologies in a small cell more effectively.

A first aspect provides a method for processing feedback information, including:

determining, by a base station, a feedback manner of HARQ feedback information, where the feedback manner includes: feeding back the HARQ feedback information or not feeding back the HARQ feedback information; and sending, by the base station, first signaling to a user equipment, where the first signaling carries the feedback manner of the HARQ feedback information.

With reference to the first aspect, in a first possible implementation manner of the first aspect, the determining a feedback manner of HARQ feedback information includes:

determining the feedback manner of the HARQ feedback information in a subframe-specific or carrier-specific manner.

With reference to the first aspect or the first possible implementation manner of the first aspect, in a second possible implementation manner of the first aspect, before the determining a feedback manner of HARQ feedback information, the method further includes:

receiving, by the base station, reception error information reported by the user equipment, so as to determine the feedback manner of the HARQ feedback information according to the reception error information; or receiving, by the base station, an HARQ feedback information request command sent by the user equipment, so as to determine the feedback manner of the HARQ feedback information according to the HARQ feedback information request command.

With reference to the second possible implementation manner of the first aspect, in a third possible implementation manner of the first aspect, the determining of the feedback manner of the HARQ feedback information according to the reception error information includes: when the reception error information indicates that a proportion of correct reception is greater than a first preset threshold, determining to not feedback the HARQ feedback information, or when the reception error information indicates that a proportion of incorrect reception is less than a second preset threshold, determining to not feed back the HARQ feedback information, or when the reception error information indicates that a ratio of correct reception to incorrect reception is greater than a third threshold, determining to not feedback the HARQ feedback information; and when the reception error information indicates that the proportion of the correct reception is less than the first preset threshold, determining to feed back the HARQ feedback information, or when the reception error information indicates that the proportion of the incorrect reception is greater than the second preset threshold, determining to feed back the HARQ feedback information, or when the reception error information indicates that the ratio of the correct reception to the incorrect reception is less than the third threshold, determining to feed back the HARQ feedback information; or the determining of the feedback manner of the HARQ feedback information according to the HARQ feedback information request command includes: when the HARQ feedback information request command indicates an request that the HARQ feedback information be fed back, determining to feed back the HARQ feedback information; and when the HARQ feedback information request command indicates an request that the HARQ feedback information not be fed back, determining to not feed back the HARQ feedback information.

With reference to the first aspect, in a fourth possible implementation manner of the first aspect, after the sending, by the base station, first signaling to a user equipment, the method further includes:

sending, by the base station, a physical downlink shared channel PDSCH to the user equipment, where information carried by the PDSCH includes a dedicated control channel DCCH, so that the user equipment determines that a feedback manner of HARQ feedback information of the PDSCH is to feedback the HARQ feedback information, and the DCCH includes channel resource information required by the HARQ feedback information.

With reference to the first aspect or any one of the first to the fourth possible implementation manners of the first aspect, in a fifth possible implementation manner of the first aspect, the first signaling is radio resource control RRC signaling, or media access control MAC signaling, or physical layer signaling.

With reference to the fifth possible implementation manner of the first aspect, in a sixth possible implementation manner of the first aspect, the first signaling is specifically downlink control information DCI in the physical layer signaling, and the DCI includes a bit field indicating the feedback manner of the HARQ feedback information.

With reference to the sixth possible implementation manner of the first aspect, in a seventh possible implementation manner of the first aspect, the bit field has 1 bit, which is used for indicating that the HARQ feedback information is fed back or the HARQ feedback information is not fed back; or the bit field has 2 bits, which are used for indicating that the HARQ feedback information is not fed back, or indicating a specific channel resource or feedback manner used for feeding back the HARQ feedback information.

With reference to the sixth possible implementation manner of the first aspect, in an eighth possible implementation manner of the first aspect, the bit field of the DCI includes feedback manners of HARQ feedback information of at least two user equipments.

With reference to the first aspect or any one of the first to the eighth possible implementation manners of the first aspect, in a ninth possible implementation manner of the first aspect, the sending first signaling includes:

sending the first signaling in a dynamic notification manner; or sending the first signaling in a periodic notification manner; or sending the first signaling in a semi-persistent notification manner.

With reference to the first aspect or any one of the first to the ninth possible implementation manners of the first aspect, in a tenth possible implementation manner of the first aspect, during or after the sending, by the base station, first signaling to a user equipment, the method further includes:

sending, by the base station, validation time of the first signaling to the user equipment, where the validation time of the first signaling indicates start time at which the first signaling is validated, so that the user equipment determines, according to the validation time of the first signaling, the start time at which the first signaling is validated, determines the feedback manner of the HARQ feedback information from the start time according to the first signaling, and feeds back or does not feedback the HARQ feedback information to the base station according to the feedback manner; and/or sending, by the base station, a validity period of the first signaling to the user equipment, so that the first signaling is invalidated when the validity period expires.

With reference to the tenth possible implementation manner of the first aspect, in an eleventh possible implementation manner of the first aspect, after the sending, by the base station, first signaling to a user equipment, the method further includes:

sending, by the base station, a release command to the user equipment, so as to indicate that the first signaling is invalidated.

With reference to the first aspect or any one of the first to the eleventh possible implementation manners of the first aspect, in a twelfth possible implementation manner of the first aspect, when the base station determines that the feedback manner of the HARQ feedback information is to not feed back the HARQ feedback information, after the sending, by the base station, first signaling to a user equipment, the method further includes:

sending, by the base station, scheduling information to the user equipment, where the scheduling information includes a modulation and coding scheme MCS and a power control parameter, the MCS and the power control parameter are determined according to a target value of a block error ratio BLER, and the target value of the BLER is less than 0.1.

A second aspect provides a method for processing feedback information, including:

receiving, by a user equipment, first signaling sent by a base station, where the first signaling carries a feedback manner of HARQ feedback information, and the feedback manner includes: feeding back the HARQ feedback information or not feeding back the HARQ feedback information; and feeding back or not feeding back, by the user equipment, the HARQ feedback information to the base station according to the first signaling.

With reference to the second aspect, in a first possible implementation manner of the second aspect, before the receiving, by a user equipment, first signaling sent by a base station, the method further includes:

sending, by the user equipment, reception error information or an HARQ feedback information request command to the base station, so that the base station determines the feedback manner of the HARQ feedback information according to the reception error information or the HARQ feedback information request command.

With reference to the second aspect or the first possible implementation manner of the second aspect, in a second possible implementation manner of the second aspect, after the receiving, by a user equipment, first signaling sent by a base station, the method further includes:

receiving, by the user equipment, a physical downlink shared channel PDSCH sent by the base station, and when information carried by the PDSCH includes a dedicated control channel DCCH, determining that a feedback manner of HARQ feedback information of the PDSCH is to feed back the HARQ feedback information, where the DCCH includes channel resource information required by the HARQ feedback information.

With reference to the second aspect or either one of the first to the second possible implementation manners of the second aspect, in a third possible implementation manner of the second aspect, the first signaling is radio resource control RRC signaling, or media access control MAC signaling, or physical layer signaling.

With reference to the third possible implementation manner of the second aspect, in a fourth possible implementation manner of the second aspect, the first signaling is specifically downlink control information DCI in the physical layer signaling, and the DCI includes a bit field indicating the feedback manner of the HARQ feedback information.

With reference to the fourth possible implementation manner of the second aspect, in a fifth possible implementation manner of the second aspect, the bit field has 1 bit, which is used for indicating that the HARQ feedback information is fed back or the HARQ feedback information is not fed back; or the bit field has 2 bits, which are used for indicating that the HARQ feedback information is not fed back, or indicating a specific channel resource or feedback manner used for feeding back the HARQ feedback information.

With reference to the fourth possible implementation manner of the second aspect, in a sixth possible implementation manner of the second aspect, the bit field of the DCI includes feedback manners of HARQ feedback information of at least two user equipments.

With reference to the second aspect or any one of the first to the sixth possible implementation manners of the second aspect, in a seventh possible implementation manner of the second aspect, during or after the receiving, by a user equipment, first signaling sent by a base station, the method further includes:

obtaining, by the user equipment, validation time of the first signaling, where the validation time of the first signaling indicates start time at which the first signaling is validated, so that the user equipment determines, according to the validation time of the first signaling, the start time at which the first signaling is validated, determines the feedback manner of the HARQ feedback information from the start time according to the first signaling, and feeds back or does not feed back the HARQ feedback information to the base station according to the feedback manner; and/or obtaining, by the user equipment, a validity period of the first signaling, and determining, when the validity period expires, that the first signaling is invalidated.

With reference to the seventh possible implementation manner of the second aspect, in an eighth possible implementation manner of the second aspect, after the receiving, by the user equipment, the first signaling, the method further includes:

receiving a release command sent by the base station, and determining, after the release command is received, that the first signaling is invalidated.

With reference to the second aspect or any one of the first to the eighth possible implementation manners of the second aspect, in a ninth possible implementation manner of the second aspect, after the receiving, by a user equipment, first signaling sent by a base station, the method further includes:

receiving, by the user equipment, scheduling information sent by the base station, where the scheduling information includes a modulation and coding scheme MCS and a power control parameter, the MCS and the power control parameter are determined according to a target value of a block error ratio BLER, and the target value of the BLER is less than 0.1.

A third aspect provides a base station, including:

a determining module, configured to determine a feedback manner of HARQ feedback information, where the feedback manner includes: feeding back the HARQ feedback information or not feeding back the HARQ feedback information; and a sending module, configured to send first signaling to a user equipment, where the first signaling carries the feedback manner of the HARQ feedback information determined by the determining module.

With reference to the third aspect, in a first possible implementation manner of the third aspect, the determining module is specifically configured to:

determine the feedback manner of the HARQ feedback information in a subframe-specific or carrier-specific manner.

With reference to the third aspect or the first possible implementation manner of the third aspect, in a second possible implementation manner of the third aspect, the base station further includes a receiving module, where:

the receiving module is configured to receive reception error information reported by the user equipment; the determining module includes a first unit, where the first unit is configured to determine the feedback manner of the HARQ feedback information according to the reception error information received by the receiving module; or the receiving module is configured to receive an HARQ feedback information request command sent by the user equipment; the determining module includes a second unit, where the second unit is configured to determine the feedback manner of the HARQ feedback information according to the HARQ feedback information request command received by the receiving module.

With reference to the second possible implementation manner of the third aspect, in a third possible implementation manner of the third aspect, the first unit is specifically configured to: when the reception error information indicates that a proportion of correct reception is greater than a first preset threshold, determine to not feedback the HARQ feedback information, or when the reception error information indicates that a proportion of incorrect reception is less than a second preset threshold, determine to not feed back the HARQ feedback information, or when the reception error information indicates that a ratio of correct reception to incorrect reception is greater than a third threshold, determine to not feed back the HARQ feedback information; and when the reception error information indicates that the proportion of the correct reception is less than the first preset threshold, determine to feedback the HARQ feedback information, or when the reception error information indicates that the proportion of the incorrect reception is greater than the second preset threshold, determine to feed back the HARQ feedback information, or when the reception error information indicates that the ratio of the correct reception to the incorrect reception is less than the third threshold, determine to feedback the HARQ feedback information;

or the second unit is specifically configured to: when the HARQ feedback information request command indicates an request that the HARQ feedback information be fed back, determine to feed back the HARQ feedback information; and when the HARQ feedback information request command indicates an request that the HARQ feedback information not be fed back, determine to not feed back the HARQ feedback information.

With reference to the third aspect, in a fourth possible implementation manner of the third aspect, the sending module is further configured to:

send a physical downlink shared channel PDSCH to the user equipment, where information carried by the PDSCH includes a dedicated control channel DCCH, so that the user equipment determines that a feedback manner of HARQ feedback information of the PDSCH is to feed back the HARQ feedback information, and the DCCH includes channel resource information required by the HARQ feedback information.

With reference to the third aspect or any one of the first to the fourth possible implementation manners of the third aspect, in a fifth possible implementation manner of the third aspect, the first signaling sent by the sending module is radio resource control RRC signaling, or media access control MAC signaling, or physical layer signaling.

With reference to the fifth possible implementation manner of the third aspect, in a sixth possible implementation manner of the third aspect, the first signaling sent by the sending module is specifically downlink control information DCI in the physical layer signaling, and the DCI includes a bit field indicating the feedback manner of the HARQ feedback information.

With reference to the sixth possible implementation manner of the third aspect, in a seventh possible implementation manner of the third aspect, the bit field included in the first signaling that is sent by the sending module and is specifically the DCI has 1 bit, which is used for indicating that the HARQ feedback information is fed back or the HARQ feedback information is not fed back; or the bit field included in the first signaling that is sent by the sending module and is specifically the DCI has 2 bits, which are used for indicating that the HARQ feedback information is not fed back, or indicating a specific channel resource or feedback manner used for feeding back the HARQ feedback information.

With reference to the sixth possible implementation manner of the third aspect, in an eighth possible implementation manner of the third aspect, the bit field included in the first signaling that is sent by the sending module and is specifically the DCI includes feedback manners of HARQ feedback information of at least two user equipments.

With reference to the third aspect or any one of the first to the eighth possible implementation manners of the third aspect, in a ninth possible implementation manner of the third aspect, the sending module is specifically configured to:

send the first signaling in a dynamic notification manner; or send the first signaling in a periodic notification manner; or send the first signaling in a semi-persistent notification manner.

With reference to the third aspect or any one of the first to the ninth possible implementation manners of the third aspect, in a tenth possible implementation manner of the third aspect, the sending module is further configured to:

send validation time of the first signaling to the user equipment, where the validation time of the first signaling indicates start time at which the first signaling is validated, so that the user equipment determines, according to the validation time of the first signaling, the start time at which the first signaling is validated, determines the feedback manner of the HARQ feedback information from the start time according to the first signaling, and feeds back or does not feed back the HARQ feedback information to the base station according to the feedback manner; and/or send a validity period of the first signaling to the user equipment, so that the first signaling is invalidated when the validity period expires.

With reference to the tenth possible implementation manner of the third aspect, in an eleventh possible implementation manner of the third aspect, the sending module is further configured to:

send a release command to the user equipment, so as to indicate that the first signaling is invalidated.

With reference to the third aspect or any one of the first to the eleventh possible implementation manners of the third aspect, in a twelfth possible implementation manner of the third aspect, when the base station determines that the feedback manner of the HARQ feedback information is to not feed back the HARQ feedback information, the sending module is further configured to:

send scheduling information to the user equipment, where the scheduling information includes a modulation and coding scheme MCS and a power control parameter, the MCS and the power control parameter are determined according to a target value of a block error ratio BLER, and the target value of the BLER is less than 0.1.

A fourth aspect provides a user equipment, including:

a receiving module, configured to receive first signaling sent by a base station, where the first signaling carries a feedback manner of HARQ feedback information, and the feedback manner includes: feeding back the HARQ feedback information or not feeding back the HARQ feedback information; and a processing module, configured to feed back or to not feed back the HARQ feedback information to the base station according to the first signaling received by the receiving module.

With reference to the fourth aspect, in a first possible implementation manner of the fourth aspect, the user equipment further includes:

a sending module, configured to send reception error information or an HARQ feedback information request command to the base station, so that the base station determines the feedback manner of the HARQ feedback information according to the reception error information or the HARQ feedback information request command.

With reference to the fourth aspect or the first possible implementation manner of the fourth aspect, in a second possible implementation manner of the fourth aspect, the receiving module is further configured to:

receive a physical downlink shared channel PDSCH sent by the base station; and the processing module is specifically configured to: when information carried by the PDSCH includes a dedicated control channel DCCH, determine that a feedback manner of HARQ feedback information of the PDSCH is to feed back the HARQ feedback information, where the DCCH includes channel resource information required by the HARQ feedback information.

With reference to the fourth aspect or either one of the first to the second possible implementation manners of the fourth aspect, in a third possible implementation manner of the fourth aspect, the first signaling received by the receiving module is radio resource control RRC signaling, or media access control MAC signaling, or physical layer signaling.

With reference to the third possible implementation manner of the fourth aspect, in a fourth possible implementation manner of the fourth aspect, the first signaling received by the receiving module is specifically downlink control information DCI in the physical layer signaling, and the DCI includes a bit field indicating the feedback manner of the HARQ feedback information.

With reference to the fourth possible implementation manner of the fourth aspect, in a fifth possible implementation manner of the fourth aspect, the bit field included in the first signaling that is received by the receiving module and is specifically the DCI has 1 bit, which is used for indicating that the HARQ feedback information is fed back or the HARQ feedback information is not fed back; or the bit field included in the first signaling that is received by the receiving module and is specifically the DCI has 2 bits, which are used for indicating that the HARQ feedback information is not fed back, or indicating a specific channel resource or feedback manner used for feeding back the HARQ feedback information.

With reference to the fourth possible implementation manner of the fourth aspect, in a sixth possible implementation manner of the fourth aspect, the bit field included in the first signaling that is received by the receiving module and is specifically the DCI includes feedback manners of HARQ feedback information of at least two user equipments.

With reference to the fourth aspect or any one of the first to the sixth possible implementation manners of the fourth aspect, in a seventh possible implementation manner of the fourth aspect, the user equipment further includes:

an obtaining module, configured to obtain validation time of the first signaling, where the validation time of the first signaling indicates start time at which the first signaling is validated; and the processing module is specifically configured to determine, according to the validation time of the first signaling, the start time at which the first signaling is validated, determine the feedback manner of the HARQ feedback information from the start time according to the first signaling, and feed back or not feed back the HARQ feedback information to the base station according to the feedback manner; and/or the obtaining module is further configured to obtain a validity period of the first signaling, and the processing module is further configured to determine, when the validity period expires, that the first signaling is invalidated.

With reference to the seventh possible implementation manner of the fourth aspect, in an eighth possible implementation manner of the fourth aspect, the receiving module is further configured to receive a release command sent by the base station, and the processing module is further configured to determine, after the release command is received, that the first signaling is invalidated.

With reference to the fourth aspect or any one of the first to the eighth possible implementation manners of the fourth aspect, in a ninth possible implementation manner of the fourth aspect, the receiving module is further configured to:

receive scheduling information sent by the base station, where the scheduling information includes a modulation and coding scheme MCS and a power control parameter, the MCS and the power control parameter are determined according to a target value of a block error ratio BLER, and the target value of the BLER is less than 0.1.

According to the technical solutions, a base station sends first signaling to a UE, where the first signaling carries a feedback manner of HARQ feedback information. The first signaling may be used to instruct the UE that it is unnecessary to send the HARQ feedback information, which implements deactivation of the HARQ feedback information. After the deactivation of the HARQ feedback information, it is unnecessary to comply with a fixed time sequence relationship required for HARQ feedback. Therefore, limitations caused by the fixed time sequence relationship are avoided, so that a flexible subframe and a fake uplink frame and rapid carrier switching can be configured more effectively, and a UE with a single uplink transmit chain capability can be supported better, thereby implementing support for new technologies in a small cell.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

To make the embodiments of the present invention clearer and more comprehensible, the following technologies are briefly described first:

In an existing system, technologies for ensuring reliability include an HARQ technology at a media access control (MAC) layer and an automatic repeat request (ARQ) technology at a radio link control (RLC) layer.

When downlink transmission supports the HARQ technology, after receiving a physical downlink shared channel (PDSCH) in a subframe n, a UE needs to feed back a reception result to a base station in a subframe n+k, where n is a nonnegative integer, k is predefined in a standard, and k is an integer that is greater than or equal to 4. When the PDSCH is correctly received, the UE feeds back an ACK; when the PDSCH is incorrectly received, the UE feeds back a NACK. At the moment when the ACK/NACK is fed back, if no physical uplink shared channel (PUSCH) needs to be sent, the ACK/NACK is carried on a physical uplink control channel (PUSCH) for sending.

An RLC entity has 3 working modes: a transparent mode (TM), an unacknowledged mode (UM), and an acknowledged mode (AM). An ARQ is used only in the AM mode. When an RLC entity in the AM mode is used, when reception of a dedicated traffic channel (DTCH) carrying downlink data fails, the UE may send a status report to indicate that a packet is not successfully received, and then the base station initiates retransmission. Compared with the HARQ, the ARQ has a longer feedback time and a flexible feedback time. In addition, for a scenario in which a bit error rate is not large, the ARQ may obtain ideal throughput.

Before sending the PDSCH to the UE, the base station needs to configure scheduling information of the PDSCH, where the scheduling information includes a modulation and coding scheme (MCS), a power control parameter, and the like. The MCS and the power control parameter may be determined according to a target value of a block error ratio (BLER). For example, in an existing LTE system, the target value of the BLER is 0.1.

Figure 1:
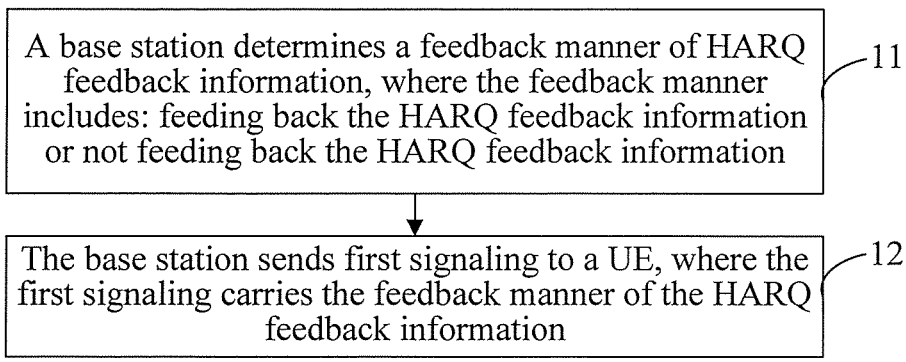
FIG. 1 is a schematic flowchart of a method for processing feedback information according to an embodiment of the present invention.

Referring to FIG. 1, an embodiment of the present invention provides a method for processing feedback information, including:

11: A base station (eNodeB, eNB) determines a feedback manner of HARQ feedback information, where the feedback manner includes: feeding back the HARQ feedback information or not feeding back the HARQ feedback information.

The HARQ feedback information includes ACK information or NACK information.

Feeding back the HARQ feedback information may indicate that an ACK/NACK is fed back, and not feeding back the HARQ feedback information may indicate that the ACK/NACK is not fed back. In this embodiment of the present invention, unless otherwise specified, "/" represents an "or" relationship.

Feeding back the ACK/NACK indicates that the ACK/NACK is fed back in an uplink subframe at an ACK/NACK feedback moment, or indicates that the ACK/NACK is fed back on a PUCCH and/or PUSCH at the ACK/NACK feedback moment.

Not feeding back the ACK/NACK indicates that the ACK/NACK is not fed back in the uplink subframe at the ACK/NACK feedback moment, or indicates that the ACK/NACK is not fed back on the PUCCH and/or PUSCH at the ACK/NACK feedback moment.

The ACK/NACK feedback moment refers to a moment determined according to HARQ feedback timing of the existing LTE. For example, if a PDSCH is received in a subframe n, the ACK/NACK feedback moment is n+k, where n is a nonnegative integer, k is predefined in a standard, and k is an integer that is greater than or equal to 4.

Optionally, feeding back the ACK/NACK may include compact ACK/NACK feedback and normal ACK/NACK feedback. The compact ACK/NACK feedback is used for reducing the number of times of ACK/NACK feedback. For example, M ACK/NACKs are uniformly fed back at a time point in a bundling or multiplexing manner; in this way, it's not needed to be separately fed back for M times (where M is an integer that is greater than 0). The normal ACK/NACK feedback is an ACK/NACK feedback manner supported by the existing standard.

Optionally, all subframes or all carriers may have the same ACK/NACK feedback manner; or the base station may determine the ACK/NACK feedback manner in a subframe-specific or carrier-specific manner, in other words, ACK/NACK feedback manners in different subframes or on different carriers are separately determined and may be the same and may also be different. For example, on a primary component carrier (PCC), the ACK/NACK feedback manner is to feed back an ACK/NACK; on a secondary component carrier (SCC), the ACK/NACK feedback manner is to not feed back an ACK/NACK. For example, in a flexible subframe, the ACK/NACK feedback manner is to not feed back an ACK/NACK; in an inflexible subframe, the ACK/NACK feedback manner is to feed back an ACK/NACK.

Channel conditions of different carriers or different subframes may vary, which provides flexibility for base station configuration.

Optionally, for all the subframes or all the carriers, or for different subframes or different carriers in the subframe-specific or carrier-specific manner, the base station may determine the feedback manner of the HARQ feedback information according to any one of the following items:

(1) The base station determines the feedback manner of the HARQ feedback information according to a channel condition.

When the channel condition is higher than a set condition, not feeding back the HARQ feedback information is determined; when the channel condition is lower than the set condition, feeding back the HARQ feedback information is determined. It may be understood that, when the channel condition is equal to the set condition, not feeding back the HARQ feedback information is determined, or feeding back the HARQ feedback information is determined.

The channel condition may refer to a channel condition of a downlink channel.

The base station may determine the channel condition according to any one of the following items:

the base station determines the channel condition according to channel state information (CSI) reported by the UE. When a numerical value of the CSI is greater than a set value, it indicates that the channel condition is higher than the set condition, and then not feeding back an ACK/NACK is determined; or when a numerical value of the CSI is less than a set value, it indicates that the channel condition is lower than the set condition, and then feeding back an ACK/NACK is determined; or in a time division duplex (TDD) system, the base station determines the channel condition according to reciprocity between uplink and downlink channels in the TDD system by measuring a sounding reference signal (SRS) sent in an uplink by the UE. For example, the base station obtains signal strength and/or signal quality of the SRS by measurement. When a numerical value of the signal strength and/or signal quality is greater than a set value, it indicates that the channel condition of the uplink channel is good, and further it is determined, according to the reciprocity, that the channel condition of the downlink channel is also good. Therefore, not feeding back an ACK/NACK may be determined; otherwise, feeding back an ACK/NACK may be determined; or if a current ACK/NACK feedback manner is to feed back an ACK/NACK, the base station may determine the channel condition according to a feedback ratio of the ACK to the NACK. For example, when the ratio of the ACK to the NACK is greater than a set value, it is determined that the channel condition is higher than the set condition, and then not feeding back the ACK/NACK is determined; otherwise, feeding back the ACK/NACK is determined.

(2) The base station determines the feedback manner of the HARQ feedback information according to reception error information reported by the UE.

The reception error information is used for indicating a proportion of incorrect reception, or a proportion of correct reception, or a ratio of correct reception to incorrect reception.

When the reception error information indicates that the proportion of the correct reception is greater than a threshold, or the proportion of the incorrect reception is less than a threshold, or the ratio of the correct reception to the incorrect reception is greater than a threshold (for example, the proportion of the correct reception is greater than 90%, or the proportion of the incorrect reception is less than 10%, or the ratio of the correct reception to the incorrect reception is greater than 9), not feeding back an ACK/NACK is determined; when the reception error information indicates that the proportion of the correct reception is less than a threshold, or the proportion of the incorrect reception is greater than a threshold, or the ratio of the correct reception to the incorrect reception is less than a threshold (for example, the proportion of the correct reception is less than 90%, or the proportion of the incorrect reception is greater than 10%, or the ratio of the correct reception to the incorrect reception is less than 9), feeding back an ACK/NACK is determined.

The reception error information may be regarded as new CSI, which is measured in a CSI measurement manner and is reported in a CSI reporting manner.

By using high layer signaling, the base station may configure an observation interval for the UE to measure the reception error information, or configure start time of the observation interval. Relative to physical layer signaling, the high layer signaling is signaling with a lower frequency from a higher layer, and includes radio resource control (RRC) signaling, media access control (MAC) signaling, and the like.

(3) The base station determines the feedback manner of the HARQ feedback information according to an ACK/NACK request command sent by the UE.

The ACK/NACK request command is used for indicating an ACK/NACK feedback manner requested by the UE. The ACK/NACK request command may have 1 bit. For example, "0" indicates that the UE requests that an ACK/NACK not be fed back, and "1" indicates that the UE requests that the ACK/NACK be fed back; or "0" indicates that the UE requests that an ACK/NACK be fed back, and "1" indicates that the UE requests that the ACK/NACK not be fed back.

When the UE requests that the ACK/NACK feedback manner be to feed back the ACK/NACK, the base station may determine that the ACK/NACK feedback manner is to feed back the ACK/NACK; when the UE requests that the ACK/NACK feedback manner be to not feed back the ACK/NACK, the base station may determine that the ACK/NACK feedback manner is to not feed back the ACK/NACK.

The base station may configure sending time (which may include a sending period and an initial sending position) and a sending resource of the ACK/NACK request command by using high layer signaling. The ACK/NACK request command may be carried on a PUCCH channel; when the PUSCH is transmitted, the ACK/NACK request command is carried on the PUSCH.

12: The base station sends first signaling to the UE, where the first signaling carries the feedback manner of the HARQ feedback information.

The first signaling may be high layer signaling or physical layer signaling.

When the first signaling is the high layer signaling, optionally, the first signaling is MAC signaling or dedicated RRC signaling, and the ACK/NACK feedback manner of each UE may be separately configured by using the MAC signaling or the dedicated RRC signaling. Optionally, the first signaling may also be broadcast signaling, which exists in a master information block (MIB) and/or a system information block (SIB); in this way, the base station may uniformly perform configuration for UEs in a cell.

When the first signaling is the physical layer signaling, optionally, the first signaling is downlink control information (DCI). Before receiving or sending service data, the user equipment needs to know DCI configured by the eNB for the user equipment. The DCI is carried on a physical downlink control channel (PDCCH) or an enhanced PDCCH (ePDCCH). In addition, the first signaling may also be carried on other downlink control channels, such as a physical hybrid automatic repeat request indicator channel (PHICH) and an enhanced PHICH (ePHICH). When the first signaling is the DCI, the DCI includes a bit field indicating the ACK/NACK feedback manner. The base station may activate or deactivate the bit field by using high layer signaling. When the bit field is activated, the base station may indicate the ACK/NACK feedback manner by using the DCI; when the bit field is deactivated, the base station cannot indicate the ACK/NACK feedback manner by using the DCI, which may also indicate that the ACK/NACK feedback manner is to always feed back an ACK/NACK. A specific design method of the bit field includes:

Method 1: one bit is used to indicate the ACK/NACK feedback manner requested by the UE. For example, "0" indicates that an ACK/NACK is not fed back, and "1" indicates that the ACK/NACK is fed back; or "0" indicates that an ACK/NACK is fed back, and "1" indicates that the ACK/NACK is not fed back; or Method 2: two bits are used to indicate the ACK/NACK feedback manner requested by the UE. For example, "00" indicates that an ACK/NACK is not fed back, and "01", "10", and "11" all indicate that the ACK/NACK is fed back; however, different channel resources for ACK/NACK feedback may be distinguished, or different manners of ACK/NACK feedback may be distinguished, for example, compact ACK/NACK feedback or normal ACK/NACK feedback.

When the first signaling is the DCI, if a cyclic redundancy check (CRC) false alarm (FA) of the PDCCH occurs, the user equipment may incorrectly interpret a current ACK/NACK feedback manner. For example, the DCI indicates that an ACK/NACK is not fed back, but the UE interprets it as feeding back the ACK/NACK; in this case, the ACK/NACK sent by the UE may interfere with other UEs. To improve reliability and reduce a probability of the CRC false alarm, one piece of DCI may be used to indicate ACK/NACK feedback manners of a plurality of UEs. For example, the DCI includes a plurality of bit fields, one bit field indicates an ACK/NACK feedback manner of one UE, and the plurality of bit fields may indicate the ACK/NACK feedback manners of the plurality of UEs. Further, a bit field may be reserved in the DCI and is used as a virtual CRC, in other words, the virtual CRC is set to be a specific value; the user equipment determines the DCI only when detecting that the virtual CRC is the set specific value.

When the first signaling is the DCI, if the UE does not receive the DCI, a problem may occur. For example, the DCI indicates that an ACK/NACK is not fed back. If the UE does not receive the DCI, the base station may misunderstand a subsequent action of the UE. Solution 1: Define time (including a period and start time) at which the first signaling may be configured. Solution 2: Repeatedly or periodically send the DCI carrying the first signaling. Solution 3: After receiving the DCI carrying the first signaling, the UE needs to feed back acknowledgment information to the base station.

The first signaling may be notified in a dynamic, periodic, or semi-persistent manner. If the dynamic notification manner is used, in other words, the first signaling is sent at any time, configuration of the ACK/NACK feedback manner is more flexible; if the periodic notification manner is used, in other words, the first signaling is sent at a set time point, reliability can be improved and costs can be reduced; if the semi-persistent notification manner is used, in other words, the first signaling is sent after the feedback manner is changed, costs can be reduced and flexibility is achieved. In the semi-persistent notification manner, the base station configures the first signaling and sends the first signaling to the user equipment only when configuration of the ACK/NACK feedback manner is updated.

Because the base station may determine the ACK/NACK feedback manner in a subframe-specific or carrier-specific manner, the first signaling may be subframe-specific or carrier-specific, in other words, content of the first signaling configured by the base station for different subframes or different carriers may vary.

Optionally, after the base station sends the first signaling, for some specific packets, information carried by the PDSCH may further be used, so that the user equipment further determines the feedback manner of the HARQ feedback information.

It may be that, when a delay requirement of the information carried by the PDSCH is high, it may be determined that the feedback manner is to feed back an ACK/NACK, no matter whether the first signaling indicates that the ACK/NACK is fed back. It may be understood that, it is equivalent to that the user equipment may determine the ACK/NACK feedback manner preferably according to the information carried by the PDSCH, and determine the ACK/NACK feedback manner according to the first signaling when the information carried by the PDSCH cannot be correctly received.

For example, when the information carried by the PDSCH includes a dedicated control channel (DCCH), when receiving the PDSCH carrying the DCCH, the user equipment may determine that an HARQ feedback manner corresponding to the PDSCH is to feedback an ACK/NACK, no matter whether the first signaling indicates feeding back or not feeding back.

Optionally, the channel resource (such as a PUCCH resource) for ACK/NACK feedback may be carried in the information (such as the DCCH) carried by the PDSCH. When correctly receiving the information, the UE may know a correct ACK/NACK channel resource and perform feedback; when not correctly receiving the information, the UE cannot know the correct ACK/NACK channel resource, and in this case, the UE does not feed back an ACK/NACK, and the base station may know, by energy detection, that the UE does not correctly receive the information.

Figure 2:
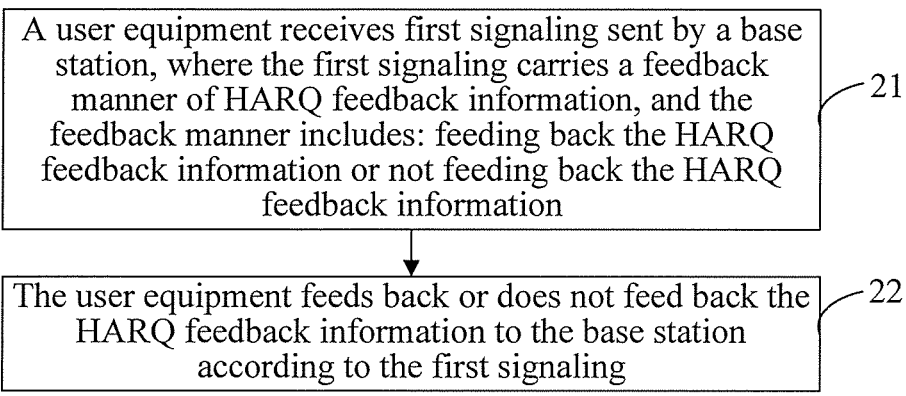
FIG. 2 is a schematic flowchart of another method for processing feedback information according to an embodiment of the present invention.

Correspondingly, referring to FIG. 2, a process executed on a UE side includes:

21: A user equipment receives first signaling sent by a base station, where the first signaling carries a feedback manner of HARQ feedback information, and the feedback manner includes: feeding back the HARQ feedback information or not feeding back the HARQ feedback information.

22: The user equipment feeds back or does not feed back the HARQ feedback information to the base station according to the first signaling.

When the first signaling indicates that the HARQ feedback information is fed back, the UE may feed back an ACK/NACK in an uplink subframe at an ACK/NACK feedback moment, or feed back the ACK/NACK on a PUCCH and/or PUSCH at the ACK/NACK feedback moment; or when the first signaling indicates that the HARQ feedback information is not fed back, the UE may not feed back an ACK/NACK in an uplink subframe at an ACK/NACK feedback moment, or may not feed back the ACK/NACK on a PUCCH and/or PUSCH at the ACK/NACK feedback moment.

Optionally, the process on the UE side may further include:

sending, by the UE, reception error information or an HARQ feedback information request command to the base station, so that the base station determines the feedback manner of the HARQ feedback information according to the reception error information or the HARQ feedback information request command.

The reception error information indicates a proportion of incorrect reception, or a proportion of correct reception, or a ratio of correct reception to incorrect reception. Specifically, the UE may calculate a ratio of the ACKs to the NACKs in received packets within an observation interval (observation interval) by error detection. For example, if, within 1 second, 90 packets are correctly received by the UE, and 10 packets are incorrectly received by the UE, a proportion of the incorrect reception is 10%, a proportion of the correct reception is 90%, and the ratio of the ACKs to the NACKs is 9. The UE quantizes the statistical information according to rules and then reports the quantized statistical information, for example, different thresholds are set and different values are used for different intervals.

The HARQ feedback information request command may also be referred to as an ACK/NACK request command, and the ACK/NACK request command indicates an ACK/NACK feedback manner requested by the UE. If a current channel condition is good, the UE can correctly receive downlink packets most of the time, and the UE may request that the ACK/NACK feedback manner be to not feed back the ACK/NACK; if the current channel condition is poor, a probability that the UE cannot correctly receive the downlink packets is high, and the UE may request that the ACK/NACK feedback manner be to feed back the ACK/NACK.

In this embodiment, a base station sends first signaling to a UE, where the first signaling carries a feedback manner of HARQ feedback information. In this way, the UE may not perform HARQ feedback; therefore, limitations to new technologies in a small cell caused by a fixed HARQ feedback time sequence are avoided, and use of the new technologies in the small cell may be supported better.

Figure 3A:
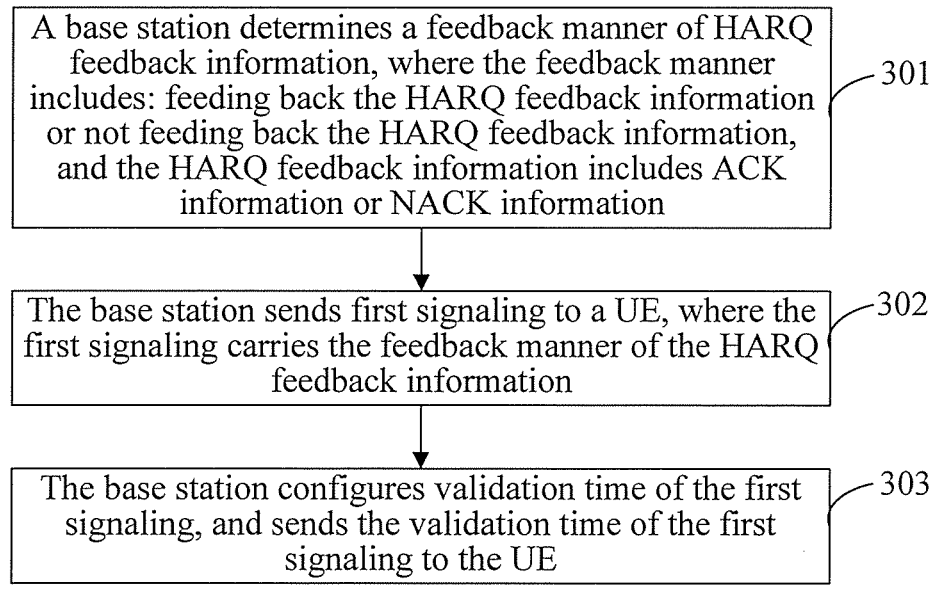
FIG. 3a is a schematic flowchart of another method for processing feedback information according to an embodiment of the present invention.

To enable a UE to precisely receive first signaling, referring to FIG. 3a, an embodiment of the present invention provides another method for processing feedback information, including:

301: A base station determines a feedback manner of HARQ feedback information, where the feedback manner includes: feeding back the HARQ feedback information or not feeding back the HARQ feedback information, and the HARQ feedback information includes ACK information or NACK information.

302: The base station sends first signaling to a UE, where the first signaling carries the feedback manner of the HARQ feedback information.

For specific content of 301 to 302, reference may be made to 11 to 12.

303: The base station configures validation time of the first signaling, and sends the validation time of the first signaling to the UE.

The validation time of the first signaling refers to start time at which the first signaling is validated. The validation time may be configured in the following manners:

Manner 1: The base station notifies the UE of a system frame number (SFN) used for indicating that the first signaling is validated.

It should be noted that, the SFN is numbered cyclically. If 10 bits are used to mark the SFN, 1024 system frames/radio frames may be marked in total, in other words, they are numbered from 0 to 1023 and then from 0 again. Therefore, a validated system frame number refers to a system frame number that is closest to a current system frame number and satisfies a requirement. From the perspective of the base station side, the current system frame number refers to the number of the system frame in which the base station sends the first signaling; from the perspective of the UE side, the current system frame number refers to the number of the system frame in which the UE receives the first signaling or feeds back, to the base station, that the first signaling is correctly received.

It should be noted that, the validation time is after the time at which the base station notifies the UE of the validation time or after the time at which the UE receives the validation time or feeds back that the validation time is correctly received. For example, the base station notifies the UE that the first signaling is validated when the SFN is 640; if the number of current frame is 620, the first signaling is validated in a next $20^{th}$ radio frame; if the current frame is 1020, the first signaling is validated in a radio frame whose SFN is 640 in a next round, in other words, waiting for 643 radio frames is needed for the validity.

Manner 2: The base station notifies the UE that the first signaling starts to be validated in an $N^{th}$ subframe or an $M^{th}$ millisecond after the first signaling is received or in an $N^{th}$ subframe or an $M^{th}$ millisecond after information indicating that the first signaling is correctly received is fed back to the base station, where N is an integer that is greater than or equal to 0, and M is an integer that is greater than or equal to 0.

In a manner in which the base station notifies the UE of the validation time in manner 1 and manner 2, when the first signaling is dedicated RRC signaling, the base station may notify the UE of the validation time of the first signaling by using the RRC signaling; when the first signaling is broadcast signaling, the base station may notify the UE of the validation time of the first signaling by using the broadcast signaling.

The first signaling and the validation time of the first signaling may be notified to the UE by using a same piece of signaling or different pieces of signaling.

Manner 3: The validation time of the first signaling is predefined. Specifically, a system frame number used for indicating that the first signaling is validated may be predefined. For example, predefined system frame numbers in which the first signaling is validated are a, a+640, a+2*640, . . . , and a+b*640 (a is an integer that is greater than or equal to 0, and b is an integer that is greater than or equal to 0). Assuming that a=0 and a current system frame number is 600, a system frame number closest to the current frame number is 640, in other words, the first signaling is validated when the SFN is 640.

Manner 4: It is predefined that the first signaling is validated in an $O^{th}$ subframe or a $P^{th}$ millisecond after the user equipment receives the first signaling or in an $O^{th}$ subframe or a $P^{th}$ millisecond after information indicating that the first signaling is correctly received is fed back to the base station, where O is an integer that is greater than or equal to 0, and P is an integer that is greater than or equal to 0.

In manner 3 and manner 4, predefinition is performed on the UE side, where the base station does not need to notify the UE by using signaling.

A fuzzy period between a base station and a user equipment can be reduced or eliminated by configuring validation time, which improves ACK/NACK validity, and prevents extra ACK/NACK interference or ACK/NACK error detection.

In addition, 303 has no time sequence limitation relationship with 301 and 302.

Optionally, after the first signaling is validated, the following manners may be used to indicate that the first signaling is invalidated.

Optionally, the method may further include:

sending, by the base station, a release (release) command to the UE, where the release command is used for deactivating the first signaling, in other words, indicating that the first signaling is invalidated.

After receiving the release command, the UE may use a default ACK/NACK feedback manner, for example, the default ACK/NACK feedback manner is to feed back an ACK/NACK.

The release command may be RRC signaling, MAC signaling or physical layer signaling, such as signaling in a PDCCH.

Alternatively, optionally, the method may further include:

configuring and sending, by the base station, a validity period of the first signaling, the first signaling is invalidated when the validity period expires.

The validity period of the first signaling refers to duration in which the first signaling is valid. For example, if the configured validation time of the first signaling is an SFN, the SFN is NO, and the configured validity period of the first signaling is N1 subframes, the first signaling is valid in N0, N0+1, N0+2, . . . , and N0+N1-1 subframes; processing may be performed on the subframes according to the first signaling.

Specifically, the step that, the first signaling is invalidated when the valid time expires, comprises:

when the time from the moment at which the UE successfully receives the PDCCH or the PDSCH for the last time to the current time exceeds the validity period, the first signaling is invalidated; and/or when the time from the moment at which the UE receives the first signaling to the current time exceeds the validity period, the first signaling is invalidated.

A minimum unit of the validity period (duration) may be at a radio frame level, and one radio frame is 10 ms. For example, the base station configures current first signaling to be valid in 100 radio frames or 50 radio frames;

Alternatively, a minimum unit of the validity period may also be at a millisecond (ms) level. For example, the base station configures the current first signaling to be valid in 100 ms or 1000 ms.

The base station may notify the UE of the validity period of the first signaling, or may also notify the UE of the validity period of the first signaling which is predefined in a standard.

Figure 3B:
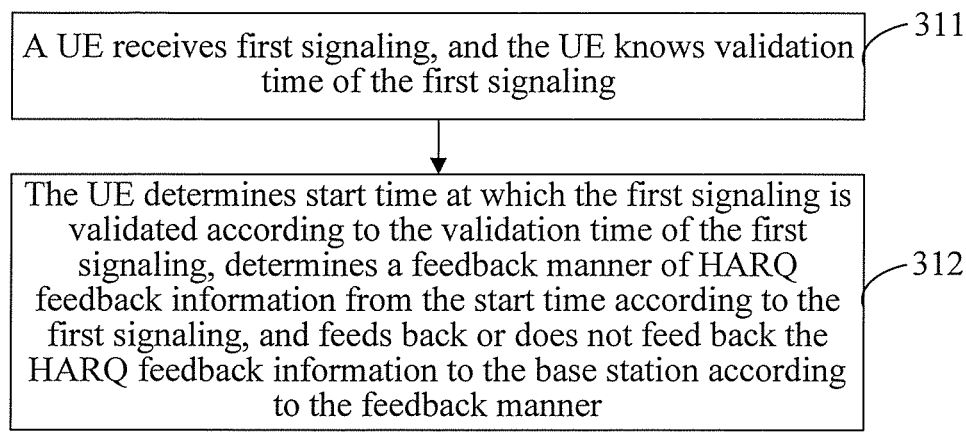
FIG. 3b is a schematic flowchart of another method for processing feedback information according to an embodiment of the present invention.

Correspondingly, referring to FIG. 3b, a process on a UE side may include:

311: A UE receives first signaling, and the UE knows validation time of the first signaling.

For example, the UE may receive a notification message sent by a base station, where the notification message is used for notifying the UE of a system frame number used for indicating that the first signaling is validated, or is used for notifying the UE that the first signaling starts to be validated in an $N^{th}$ subframe or an $M^{th}$ millisecond after the first signaling is received or in an $N^{th}$ subframe or an $M^{th}$ millisecond after information indicating that the first signaling is correctly received is fed back the base station, where N is an integer that is greater than or equal to 0, and M is an integer that is greater than or equal to 0; or the UE may know, according to predefined information, the validation time of the first signaling, where the predefined information may include that: the validation time of the first signaling is predefined, or it is predefined that the first signaling is validated in an $O^{th}$ subframe or a $P^{th}$ millisecond after the user equipment receives the first signaling or in an $O^{th}$ subframe or a $P^{th}$ millisecond after information indicating that the first signaling is correctly received is fed back to the base station, where O is an integer that is greater than or equal to 0, and P is an integer that is greater than or equal to 0.

312: The UE determines start time at which the first signaling is validated according to the validation time of the first signaling, determines a feedback manner of HARQ feedback information from the start time according to the first signaling, and feeds back or does not feed back the HARQ feedback information to the base station according to the feedback manner.

For example, the base station notifies that a system frame number used for indicating that the first signaling is validated is 640. If a frame number is 620 when the UE receives the first signaling, when 10 bits are used to mark the system frame number, the feedback manner of the HARQ feedback information is determined from a next $20^{th}$ radio frame according to an indication of the first signaling, and feeding back or not feeding back is performed correspondingly.

Specifically, when the first signaling indicates that the HARQ feedback information is fed back, the UE may feed back an ACK/NACK in an uplink subframe at an ACK/NACK feedback moment, or feed back the ACK/NACK on a PUCCH and/or PUSCH at the ACK/NACK feedback moment; or when the first signaling indicates that the HARQ feedback information is not fed back, the UE may not feed back an ACK/NACK in an uplink subframe at an ACK/NACK feedback moment, or not feed back the ACK/NACK on a PUCCH and/or PUSCH at the ACK/NACK feedback moment.

Optionally, after the base station sends a release command and/or a validity period of the first signaling to the UE, the UE may determine whether the first signaling is invalidated according to the release command and/or the validity period. After the first signaling is invalidated, the UE may use a default ACK/NACK feedback manner. Preferably, the default ACK/NACK feedback manner is to feed back the ACK/NACK.

For specific content of related descriptions on the UE side, reference may be made to the foregoing descriptions on the base station side.

In this embodiment, a fuzzy period between a base station and a UE can be reduced or eliminated by configuring validation and/or invalidation of first signaling, which improves ACK/NACK validity, and prevents extra ACK/NACK interference or ACK/NACK error detection.

Figure 4A:
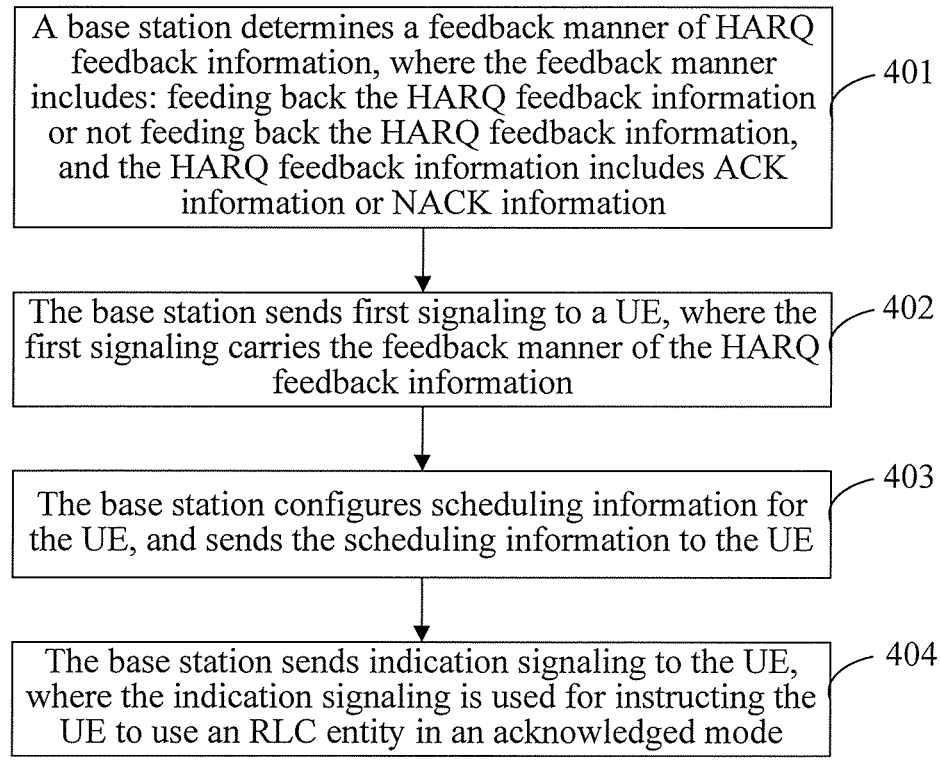
FIG. 4a is a schematic flowchart of another method for processing feedback information according to an embodiment of the present invention.

FIG. 4a is a schematic flowchart of another method for processing feedback information according to an embodiment of the present invention, including:

401: A base station determines a feedback manner of HARQ feedback information, where the feedback manner includes: feeding back the HARQ feedback information or not feeding back the HARQ feedback information, and the HARQ feedback information includes ACK information or NACK information.

402: The base station sends first signaling to a UE, where the first signaling carries the feedback manner of the HARQ feedback information.

For specific content of 401 to 402, reference may be made to 11 to 12.

403: The base station configures scheduling information for the UE and sends the scheduling information to the UE.

Before sending a PDSCH to the UE, the base station needs to configure the scheduling information, which includes an MCS, a power control parameter, and the like, where the MCS and the power control parameter may be determined according to a target value of a BLER. In the prior art, the target value of the BLER is 0.1. In this embodiment, the target value of the BLER may be determined to be a value that is less than that in the prior art, for example, the target value is set to 0.01. Then the MCS and the power control parameter are obtained according to the target value 0.01.

In this way, when 100 packets are sent, an error occurs only on one packet. Because an error rate is low, ideal throughput can be obtained by only using an ARQ; moreover, limitations to new technologies in a small cell caused by strict requirements of an HARQ time sequence can be greatly reduced.

403 has no time sequence limitation relationship with 401 and 402.

To improve reliability, an ARQ at an RLC layer may further be initiated in this embodiment, in other words, the method may further include:

404: The base station sends indication signaling to the UE, where the indication signaling is used for instructing the UE to use an RLC entity in an acknowledged mode.

After the UE uses the RLC entity in the acknowledged mode, it indicates that the ARQ at the RLC layer is initiated, which can improve the reliability.

Figure 4B:
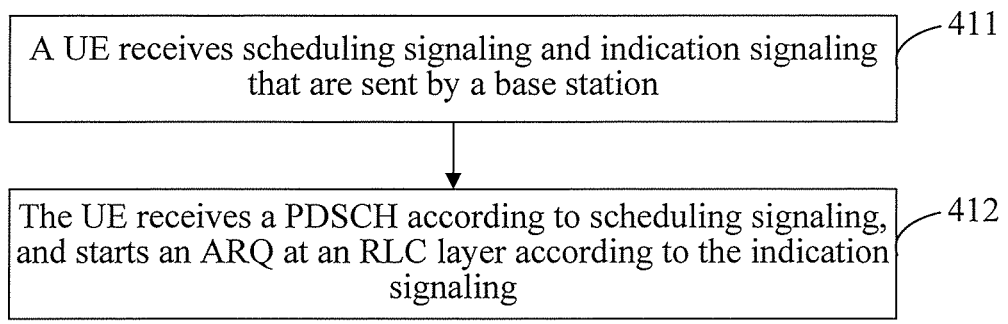
FIG. 4b is a schematic flowchart of another method for processing feedback information according to an embodiment of the present invention.

Correspondingly, referring to FIG. 4b, a process on a UE side may include:

411: A UE receives scheduling signaling and indication signaling that are sent by a base station.

412: The UE receives a PDSCH according to the scheduling signaling, and starts an ARQ at an RLC layer according to the indication signaling.

It may be understood that, the UE may further receive first signaling sent by the base station, and in an HARQ scenario, determine a feedback manner of HARQ feedback information according to the first signaling.

In this embodiment, a target value of a BLER is changed, and scheduling information is configured according to a new target value, which can ensure that ideal throughput can be obtained when a UE uses an ARQ only, and prevent limitations to new technologies in a small cell caused by a fixed HARQ time sequence.

Figure 5:
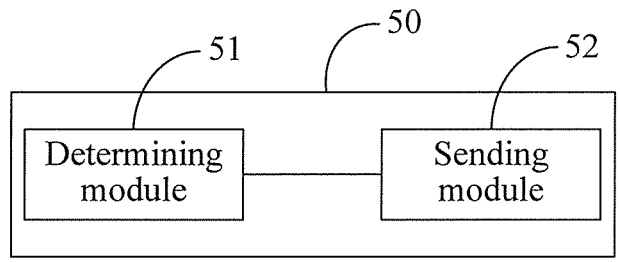
FIG. 5 is a schematic structural diagram of a base station according to an embodiment of the present invention.

FIG. 5 is a schematic structural diagram of a base station according to an embodiment of the present invention. A base station 50 includes a determining module 51 and a sending module 52. The determining module 51 is configured to determine a feedback manner of HARQ feedback information, where the feedback manner includes: feeding back the HARQ feedback information or not feeding back the HARQ feedback information; the sending module 52 is configured to send first signaling to a user equipment, where the first signaling carries the feedback manner of the HARQ feedback information determined by the determining module.

The HARQ feedback information may include ACK information or NACK information.

Optionally, the determining module 51 is specifically configured to:

determine the feedback manner of the HARQ feedback information in a subframe-specific or carrier-specific manner.

Feedback manners of HARQ feedback information in different subframes or on different carriers may be the same or different.

Optionally, the base station further includes a receiving module, where:

the receiving module is configured to receive reception error information reported by the user equipment; the determining module includes a first unit, where the first unit is configured to determine the feedback manner of the HARQ feedback information according to the reception error information received by the receiving module; or the receiving module is configured to receive an HARQ feedback information request command sent by the user equipment; the determining module includes a second unit, where the second unit is configured to determine the feedback manner of the HARQ feedback information according to the HARQ feedback information request command received by the receiving module.

Optionally, the first unit is specifically configured to: when the reception error information indicates that a proportion of correct reception is greater than a first preset threshold, determine to not feedback the HARQ feedback information, or when the reception error information indicates that a proportion of incorrect reception is less than a second preset threshold, determine to not feed back the HARQ feedback information, or when the reception error information indicates that a ratio of correct reception to incorrect reception is greater than a third threshold, determine to not feed back the HARQ feedback information; and when the reception error information indicates that the proportion of the correct reception is less than the first preset threshold, determine to feedback the HARQ feedback information, or when the reception error information indicates that the proportion of the incorrect reception is greater than the second preset threshold, determine to feed back the HARQ feedback information, or when the reception error information indicates that the ratio of the correct reception to the incorrect reception is less than the third threshold, determine to feedback the HARQ feedback information;

or the second unit is specifically configured to: when the HARQ feedback information request command indicates an request that the HARQ feedback information be fed back, determine to feed back the HARQ feedback information; and when the HARQ feedback information request command indicates an request that the HARQ feedback information not be fed back, determine to not feed back the HARQ feedback information.

Optionally, the sending module 52 is further configured to send a PDSCH to the user equipment, where information carried by the PDSCH includes a DCCH, so that the user equipment determines that a feedback manner of HARQ feedback information of the PDSCH is to feedback the HARQ feedback information, and the DCCH includes channel resource information required by the HARQ feedback information.

Optionally, the first signaling sent by the sending module is radio resource control RRC signaling, or media access control MAC signaling, or physical layer signaling.

Optionally, the first signaling sent by the sending module is specifically downlink control information DCI in the physical layer signaling, and the DCI includes a bit field indicating the feedback manner of the HARQ feedback information.

Optionally, the bit field included in the first signaling that is sent by the sending module and is specifically the DCI has 1 bit, which is used for indicating that the HARQ feedback information is fed back or the HARQ feedback information is not fed back; or the bit field included in the first signaling that is sent by the sending module and is specifically the DCI has 2 bits, which are used for indicating that the HARQ feedback information is not fed back, or indicating a specific channel resource or feedback manner used for feeding back the HARQ feedback information.

Optionally, the bit field included in the first signaling that is sent by the sending module and is specifically the DCI includes feedback manners of HARQ feedback information of at least two user equipments.

Optionally, the sending module 52 is specifically configured to:

send the first signaling in a dynamic notification manner; or send the first signaling in a periodic notification manner; or send the first signaling in a semi-persistent notification manner.

Optionally, the sending module 52 is further configured to: send validation time of the first signaling to the user equipment, where the validation time of the first signaling indicates start time at which the first signaling is validated, so that the user equipment determines, according to the validation time of the first signaling, the start time at which the first signaling is validated, determines the feedback manner of the HARQ feedback information from the start time according to the first signaling, and feeds back or does not feed back the HARQ feedback information to the base station according to the feedback manner; and/or send a validity period of the first signaling to the user equipment, so that the first signaling is invalidated when the validity period expires.

Optionally, the sending module 52 is further configured to:

send a release command to the user equipment, so as to indicate that the first signaling is invalidated.

Optionally, when the base station determines that the feedback manner of the HARQ feedback information is to not feedback the HARQ feedback information, the sending module 52 is further configured to:

send scheduling information to the user equipment, where the scheduling information includes an MCS and a power control parameter, the MCS and the power control parameter are determined according to a target value of a BLER, and the target value of the BLER is less than 0.1.

For hardware implementation, the sending module may be a transmitter or a transceiver. The receiving module may be a receiver or a transceiver. The determining module may be a processor, or may be embedded in or independent of the processor in a hardware form or may also be stored in a memory in a software form, so that the processor invokes and executes operations corresponding to the modules. The processor may be a central processing unit (CPU), a microprocessor, a single-chip microcomputer, or the like. It may be understood that, the base station may further include universal components such as a memory, an antenna, a baseband processing component, intermediate radio frequency processing components, and input and output apparatuses, which is not limited herein in this embodiment of the present invention.

It should be noted that, the base station shown in FIG. 5 may be used to implement any method of the base station provided in the method embodiments, and related descriptions are the same as the descriptions of the method embodiments, which are not described herein again.

In this embodiment, a base station sends first signaling to a UE, where the first signaling carries a feedback manner of HARQ feedback information. In this way, the UE may not perform HARQ feedback; therefore, limitations to new technologies in a small cell caused by a fixed HARQ feedback time sequence are avoided, and use of the new technologies in the small cell may be supported better.

Figure 6:
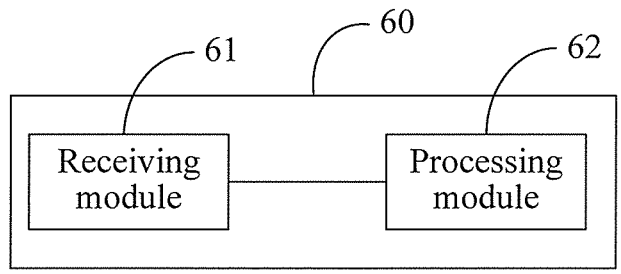
FIG. 6 is a schematic structural diagram of a user equipment according to an embodiment of the present invention.

FIG. 6 is a schematic structural diagram of a user equipment according to an embodiment of the present invention. A user equipment 60 includes a receiving module 61 and a processing module 62. The receiving module 61 is configured to receive first signaling sent by a base station, where the first signaling carries a feedback manner of HARQ feedback information, and the feedback manner includes: feeding back the HARQ feedback information or not feeding back the HARQ feedback information; the processing module 62 is configured to feed back or to not feed back the HARQ feedback information to the base station according to the first signaling.

Optionally, the user equipment 60 further includes:
a sending module, configured to send reception error information or an HARQ feedback information request command to the base station, so that the base station determines the feedback manner of the HARQ feedback information according to the reception error information or the HARQ feedback information request command.

Optionally, the receiving module 61 is further configured to:
receive a PDSCH sent by the base station; and the processing module 62 is specifically configured to: when information carried by the PDSCH includes a DCCH, determine that a feedback manner of HARQ feedback information of the PDSCH is to feed back the HARQ feedback information, where the DCCH includes channel resource information required by the HARQ feedback information.

Optionally, the first signaling received by the receiving module 61 is radio resource control RRC signaling, or media access control MAC signaling, or physical layer signaling.

Optionally, the first signaling received by the receiving module 61 is specifically downlink control information DCI in the physical layer signaling, and the DCI includes a bit field indicating the feedback manner of the HARQ feedback information.

Optionally, the bit field included in the first signaling that is received by the receiving module 61 and is specifically the DCI has 1 bit, which is used for indicating that the HARQ feedback information is fed back or the HARQ feedback information is not fed back; or the bit field included in the first signaling that is received by the receiving module 61 and is specifically the DCI has 2 bits, which are used for indicating that the HARQ feedback information is not fed back, or indicating a specific channel resource or feedback manner used for feeding back the HARQ feedback information.

Optionally, the bit field included in the first signaling that is received by the receiving module 61 and is specifically the DCI includes feedback manners of HARQ feedback information of at least two user equipments.

Optionally, the user equipment 60 further includes:
an obtaining module, configured to obtain validation time of the first signaling, where the validation time of the first signaling indicates start time at which the first signaling is validated; and the processing module is specifically configured to determine, according to the validation time of the first signaling, the start time at which the first signaling is validated, determine the feedback manner of the HARQ feedback information from the start time according to the first signaling, and feedback or not feedback the HARQ feedback information to the base station according to the feedback manner; and/or the obtaining module is further configured to obtain a validity period of the first signaling, and the processing module is further configured to determine, when the validity period expires, that the first signaling is invalidated.

Optionally,
the receiving module 61 is further configured to receive a release command sent by the base station, and the processing module is further configured to determine, after the release command is received, that the first signaling is invalidated.

Optionally, the receiving module 61 is configured to receive scheduling information sent by the base station, where the scheduling information includes an MCS and a power control parameter, the MCS and the power control parameter are determined according to a target value of a BLER, and the target value of the BLER is less than 0.1.

For hardware implementation, the receiving module may be a receiver or a transceiver, and the sending module may be a transmitter or a transceiver. The processing module may be a processor, or may be embedded in or independent of the processor in a hardware form or may also be stored in a memory in a software form, so that the processor invokes and executes operations corresponding to the modules. The processor may be a central processing unit (CPU), a microprocessor, a single-chip microcomputer, or the like. The obtaining module may specifically be a receiver or a transceiver, so as to receive the validation time of the first signaling sent by the base station and/or receive the validity period of the first signaling sent by the base station; or the obtaining module may further be specifically a processor, so as to predefine (or configure) the validation time of the first signaling and/or the validity period of the first signaling in the user equipment, where the processor may be embedded in or independent of the processor in a hardware form and may also be stored in a memory in a software form, so that the processor invokes and executes operations corresponding to the modules. The processor may be a central processing unit (CPU), a microprocessor, a single-chip microcomputer, or the like. It may be understood that, the user equipment may further include universal components such as a memory, an antenna, a baseband processing component, intermediate radio frequency processing components, and input and output apparatuses, which is not limited herein in this embodiment of the present invention.

It should be noted that, the user equipment shown in FIG. 6 may be used to implement any method of the user equipment provided in the method embodiments, and related descriptions are the same as the descriptions of the method embodiments, which are not described herein again. In this embodiment, a base station sends first signaling to the UE, where the first signaling carries a feedback manner of HARQ feedback information. In this way, the UE may not perform HARQ feedback; therefore, limitations to new technologies in a small cell caused by a fixed HARQ feedback time sequence are avoided, and use of the new technologies in the small cell may be supported better.

It may be clearly understood by a person skilled in the art that, for the purpose of convenient and brief description, divisions of the foregoing functional modules are only used as examples; in practical applications, the foregoing functions may be allocated to different modules for implementation as required, in other words, the inner structure of an apparatus is divided into different functional modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A method for processing feedback information, the method comprising:
   receiving, by a base station, reception error information reported by a user equipment, to determine a feedback manner of hybrid automatic repeat request (HARQ) feedback information according to the reception error information; or
   receiving, by the base station, an HARQ feedback information request command sent by the user equipment, to determine the feedback manner of the HARQ feedback information according to the HARQ feedback information request command;
   wherein the feedback manner comprises one of the following: feeding back the HARQ feedback information, and not feeding back the HARQ feedback information; and
   sending, by the base station, first signaling to the user equipment, wherein the first signaling carries the feedback manner of the HARQ feedback information.

2. The method according to claim 1, wherein determining the feedback manner of the HARQ feedback information comprises:
   determining the feedback manner of the HARQ feedback information in a subframe-specific or carrier-specific manner.

3. The method according to claim 1, wherein:
   determining of the feedback manner of the HARQ feedback information according to the reception error information comprises:
      when the reception error information indicates that a proportion of correct reception is greater than a first preset threshold, determining to not feed back the HARQ feedback information, or
      when the reception error information indicates that a proportion of incorrect reception is less than a second preset threshold, determining to not feed back the HARQ feedback information, or
      when the reception error information indicates that a ratio of correct reception to incorrect reception is greater than a third threshold, determining to not feed back the HARQ feedback information, or
      when the reception error information indicates that the proportion of the correct reception is less than the first preset threshold, determining to feed back the HARQ feedback information, or
      when the reception error information indicates that the proportion of the incorrect reception is greater than the second preset threshold, determining to feed back the HARQ feedback information, or
      when the reception error information indicates that the ratio of the correct reception to the incorrect reception is less than the third threshold, determining to feed back the HARQ feedback information.

4. The method according to claim 1, wherein the first signaling comprises: radio resource control (RRC) signaling, media access control (MAC) signaling, or physical layer signaling.

5. The method according to claim 4, wherein the first signaling comprises downlink control information (DCI) in the physical layer signaling, and the DCI comprises a bit field indicating the feedback manner of the HARQ feedback information.

6. The method according to claim 5, wherein:
   the bit field has 1 bit, for indicating that the HARQ feedback information is fed back or the HARQ feedback information is not fed back; or the bit field has 2 bits, for indicating that the HARQ feedback information is not fed back, or indicating a specific channel resource or feedback manner used for feeding back the HARQ feedback information.

7. The method according to claim 1, wherein sending first signaling comprises:
sending the first signaling in a dynamic notification manner; or
sending the first signaling in a periodic notification manner; or
sending the first signaling in a semi-persistent notification manner.

8. The method according to claim 1, wherein:
determining of the feedback manner of the HARQ feedback information according to the HARQ feedback information request command comprises:
when the HARQ feedback information request command indicates a request that the HARQ feedback information be fed back, determining to feed back the HARQ feedback information, or
when the HARQ feedback information request command indicates a request that the HARQ feedback information not be fed back, determining to not feedback the HARQ feedback information.

9. A method for processing feedback information, the method comprising:
determining, by a base station, feedback manner of hybrid automatic repeat request (HARP) feedback information, wherein the feedback manner comprises one of the following: feeding back the HARQ feedback information, and not feeding back the HARQ feedback information;
sending, by the base station, first signaling to a user equipment, wherein the first signaling carries the feedback manner of the HARQ feedback information; and
wherein when the base station determines that the feedback manner of the HARQ feedback information is to not feedback the HARQ feedback information, after sending, by the base station, the first signaling to the user equipment, the method further comprises:
sending, by the base station, scheduling information to the user equipment, wherein the scheduling information comprises a modulation and coding scheme (MCS) and a power control parameter, the MCS and the power control parameter are determined according to a target value of a block error ratio (BLER), and the target value of the BLER is less than 0.1.

10. A base station, comprising:
a processor; and
memory coupled to the processor, the memory comprising instructions that, when executed by the processor, cause the base station to:
receive reception error information reported by a user equipment, and determine a feedback manner of hybrid automatic repeat request (HARQ) feedback information according to the received reception error information, or
receive an HARQ feedback information request command sent by the user equipment, and determine the feedback manner of the HARQ feedback information according to the received HARQ feedback information request command;
wherein the feedback manner comprises one of the following: feeding back the HARQ feedback information and not feeding back the HARQ feedback information; and
send first signaling to a user equipment, wherein the first signaling carries the feedback manner of the HARQ feedback information determined by the determining module.

11. The base station according to claim 10, wherein the memory further comprises instruction that, when executed by the processor, cause the base station to:
determine the feedback manner of the HARQ feedback information in a subframe-specific or carrier-specific manner.

12. The base station according to claim 10, wherein the memory further comprises instruction that, when executed by the processor, cause the base station to:
when the reception error information indicates that a proportion of correct reception is greater than a first preset threshold, determine to not feedback the HARQ feedback information, or
when the reception error information indicates that a proportion of incorrect reception is less than a second preset threshold, determine to not feedback the HARQ feedback information, or
when the reception error information indicates that a ratio of correct reception to incorrect reception is greater than a third threshold, determine to not feedback the HARQ feedback information, or
when the reception error information indicates that the proportion of the correct reception is less than the first preset threshold, determine to feed back the HARQ feedback information, or
when the reception error information indicates that the proportion of the incorrect reception is greater than the second preset threshold, determine to feed back the HARQ feedback information, or
when the reception error information indicates that the ratio of the correct reception to the incorrect reception is less than the third threshold, determine to feed back the HARQ feedback information.

13. The base station according to claim 10, wherein the first signaling comprises: radio resource control (RRC) signaling, or media access control (MAC) signaling, or physical layer signaling.

14. The base station according to claim 13, wherein the first signaling comprises downlink control information (DCI) in the physical layer signaling, and the DCI comprises a bit field indicating the feedback manner of the HARQ feedback information.

15. The base station according to claim 14, wherein:
the bit field comprised in the first signaling has 1 bit, for indicating that the HARQ feedback information is fed back or the HARQ feedback information is not fed back; or
the bit field comprised in the first signaling has 2 bits, for indicating that the HARQ feedback information is not fed back, or indicating a specific channel resource or feedback manner used for feeding back the HARQ feedback information.

16. The base station according to claim 10, wherein the memory further comprises instruction that, when executed by the processor, cause the base station to:
send the first signaling in a dynamic notification manner; or
send the first signaling in a periodic notification manner; or
send the first signaling in a semi-persistent notification manner.

17. The base station according to claim 10, wherein the memory further comprises instruction that, when executed by the processor, cause the base station to:
- when the base station determines that the feedback manner of the HARQ feedback information is to not feedback the HARQ feedback information, send scheduling information to the user equipment, wherein the scheduling information comprises a modulation and coding scheme (MCS) and a power control parameter, the MCS and the power control parameter are determined according to a target value of a block error ratio (BLER), and the target value of the BLER is less than 0.1.

18. The base station according to claim 10, wherein the memory further comprises instruction that, when executed by the processor, cause the base station to:
- when the HARQ feedback information request command indicates a request that the HARQ feedback information be fed back, determine to feed back the HARQ feedback information, or
- when the HARQ feedback information request command indicates a request that the HARQ feedback information not be fed back, determine to not feedback the HARQ feedback information.

19. A user equipment, comprising:
a receiver, configured to:
- receive first signaling sent by a base station, wherein the first signaling carries a feedback manner of hybrid automatic repeat request (HARQ) feedback information, and the feedback manner comprises at least one of the following: feeding back the HARQ feedback information and not feeding back the HARQ feedback information, and
- receive scheduling information sent by the base station, wherein the scheduling information comprises a modulation and coding scheme (MCS) and a power control parameter, the MCS and the power control parameter are determined according to a target value of a block error ratio (BLER), and the target value of the BLER is less than 0.1; and a processor, configured to feed back or to not feed back the HARQ feedback information to the base station according to the first signaling received by the receiver.

* * * * *